United States Patent
Kanemoto et al.

(10) Patent No.: US 10,025,881 B2
(45) Date of Patent: Jul. 17, 2018

(54) INFORMATION PROCESSING APPARATUS, INFORMATION PROCESSING METHOD, AND PROGRAM

(71) Applicant: Sony Corporation, Minato-ku (JP)

(72) Inventors: Katsuyoshi Kanemoto, Chiba (JP); Kazunori Araki, Kanagawa (JP); Ryo Nakahashi, Tokyo (JP); Masanori Miyahara, Tokyo (JP); Kazuki Yoshiyama, Kanagawa (JP); Takagi Tomohiro, Tokyo (JP)

(73) Assignee: SONY CORPORATION, Tokyo (JP)

( * ) Notice: Subject to any disclaimer, the term of this patent is extended or adjusted under 35 U.S.C. 154(b) by 716 days.

(21) Appl. No.: 14/326,651

(22) Filed: Jul. 9, 2014

(65) Prior Publication Data
US 2015/0046417 A1 Feb. 12, 2015

(30) Foreign Application Priority Data
Aug. 6, 2013 (JP) .................. 2013-163372

(51) Int. Cl.
*G06F 17/30* (2006.01)
(52) U.S. Cl.
CPC .............. *G06F 17/30997* (2013.01)
(58) Field of Classification Search
CPC ........... G06F 17/30997; G06F 11/0703; G06F 17/30371; G06F 17/30684
See application file for complete search history.

(56) References Cited

U.S. PATENT DOCUMENTS

| | | | | |
|---|---|---|---|---|
| 7,310,612 | B2* | 12/2007 | McQueen, III | G06Q 30/02 705/26.61 |
| 8,620,919 | B2* | 12/2013 | Gates | G06F 17/30749 707/737 |
| 2003/0093518 | A1* | 5/2003 | Hiraga | H04L 63/104 709/224 |
| 2005/0177584 | A1* | 8/2005 | Naito | G06F 17/30722 |
| 2009/0100094 | A1* | 4/2009 | Verdaguer | G06F 17/30828 |
| 2009/0144226 | A1* | 6/2009 | Tateno | G06F 17/30702 |
| 2009/0234825 | A1* | 9/2009 | Xia | G06F 17/30867 |
| 2012/0036139 | A1* | 2/2012 | Okamoto | H04N 7/17318 707/749 |
| 2014/0122456 | A1* | 5/2014 | Dies | G06F 17/30707 707/706 |
| 2014/0317078 | A1* | 10/2014 | Gallagher | G06F 17/30867 707/706 |
| 2015/0169727 | A1* | 6/2015 | Araki | G06F 17/30699 707/737 |
| 2016/0224897 | A1* | 8/2016 | Wang | G06N 5/022 |

FOREIGN PATENT DOCUMENTS

| | | |
|---|---|---|
| JP | 2003-167901 | 6/2003 |
| JP | 2012-190061 | 10/2012 |

* cited by examiner

*Primary Examiner* — Noosha Arjomandi
(74) *Attorney, Agent, or Firm* — Oblon, McClelland, Maier & Neustadt, L.L.P.

(57) ABSTRACT

Disclosed is an information processing apparatus including a metadata expansion unit. The metadata expansion unit is configured to expand metadata of a target item using metadata of other items to which a responder has shown a response, the responder being a user having shown a response to the target item of which the metadata is to be expanded.

17 Claims, 8 Drawing Sheets

Feature amount of each item

| | Attribute value 1 | Attribute value 2 | Attribute value 3 | Attribute value 4 | Attribute value 5 | Attribute value 6 | Attribute value 7 | Attribute value 8 | Attribute value 9 | Attribute value 10 | Attribute value 11 | Attribute value 12 | Attribute value 13 | Attribute value 14 |
|---|---|---|---|---|---|---|---|---|---|---|---|---|---|---|
| Item 1 | 1 | | | | | | | | | | | | | |
| Item 2 | | | 1 | | | | | | | | | | | |
| Item 3 | | | 1 | | | | | 1 | | | | 1 | | |
| Item 4 | | | 1 | | | 1 | 1 | | 1 | | | | | |
| Item 5 | | | | | 1 | | | | | 1 | | | 1 | |
| Item 6 | | | | | 1 | | | | | | 1 | | | 1 |

FIG.6

Purchase history of each user

|        | User 1 | User 2 | User 3 | User 4 | User 5 | User 6 |
|--------|--------|--------|--------|--------|--------|--------|
| Item 1 |        |        | 1      |        |        |        |
| Item 2 |        | 1      |        | 1      | 1      |        |
| Item 3 | 1      |        |        |        |        |        |
| Item 4 | 1      |        |        | 1      |        | 1      |
| Item 5 |        | 1      |        |        | 1      |        |
| Item 6 |        |        | 1      |        | 1      |        |

FIG.7

Similarity with item 1

| | SimA | SimB (CBF) | SimC (CF) |
|---|---|---|---|
| Item 2 | 0.31 | 0.29 | 0.00 |
| Item 3 | 0.88 | 0.58 | 0.33 |
| Item 4 | 0.20 | 0.29 | 0.00 |
| Item 5 | 0.82 | 0.00 | 0.25 |
| Item 6 | 1.00 | 0.35 | 1.00 |

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP2013-163372 filed Aug. 6, 2013, the entire contents of which are incorporated herein by reference.

BACKGROUND

The present technology relates to information processing apparatuses, information processing methods, and programs and, in particular, to an information processing apparatus, an information processing method, and a program desirably used for expanding the metadata of an item.

Up until now, Cooperative Filtering (CF) and Content-Based Filtering (CBF) have been known as technologies for recommending items to users (see, for example, Japanese Patent Application Laid-open No. 2003-167901 and Japanese Patent Application Laid-open No. 2012-190061).

SUMMARY

However, in the application of the CBF for example, since an item having a small amount of metadata has only a few parts common to the metadata of other items and it is calculated that the similarity between the item and the other items is low, it is hardly recommended to a user.

The present technology has been made in view of the above circumstances, and it is therefore desirable to expand the metadata of an item.

An information processing apparatus according to an embodiment of the present technology includes a metadata expansion unit. The metadata expansion unit is configured to expand metadata of a target item using metadata of other items to which a responder has shown a response, the responder being a user having shown a response to the target item of which the metadata is to be expanded.

The metadata expansion unit may expand the metadata of the target item using metadata of an item to which the responder has shown a response within a prescribed period including a period in which the responder has shown the response to the target item.

The metadata expansion unit may expand the metadata of the target item using metadata of a prescribed number of items to which the responder has shown a response immediately before or after having shown the response to the target item.

The metadata expansion unit may limit the responder to a user belonging to a prescribed group to expand the metadata of the target item.

The metadata expansion unit may expand the metadata of the target item using metadata of an item belonging to a same group as the target item when the respective items are classified by a prescribed method.

The metadata expansion unit may expand the metadata of the target item in such a way that feature amount vectors based on the metadata of the respective items to which the responder has shown the response are added together.

The metadata expansion unit may increase a weight for an item, to which the responder has shown a response in a period close to a period in which the responder has shown the response to the target item, to add the feature amount vectors together.

The metadata expansion unit may assign a weight corresponding to at least one of a response type and a response degree to add the feature amount vectors together.

The metadata expansion unit may assign a weight to the responder to add the feature amount vectors together.

The metadata expansion unit may assign a weight corresponding to the number of the items, to which the responder has shown the response, to add the feature amount vectors together.

The metadata expansion unit may increase a weight for an item similar to the target item to add the feature amount vectors together.

The metadata expansion unit may set a weight for the feature amount vector of the target item at a value different from a value of a weight for the feature amount vectors of the other items.

The metadata expansion unit may not add the feature amount vector of the target item.

The information processing apparatus may further include a recommendation unit. The recommendation unit calculates, for each candidate item as a candidate item to be recommended to a target user, a score obtained by adding together similarity in the feature amount vector between the candidate item and respective items to which the target user has shown a response, and to recommend the item to the target user based on the score, in which at least one of the candidate item and the items to which the target user has shown the response uses the expanded feature amount vector to calculate the score.

The information processing apparatus may further include a search unit. The search unit searches for an item including a provided keyword in expanded metadata thereof.

An information processing method of an information processing apparatus according to another embodiment of the present technology includes: expanding metadata of a target item using metadata of other items to which a responder has shown a response, the responder being a user having shown a response to the target item of which the metadata is to be expanded.

A program according to still another embodiment of the present technology causes a computer to execute processing including: expanding metadata of a target item using metadata of other items to which a responder has shown a response, the responder being a user having shown a response to the target item of which the metadata is to be expanded.

According to an embodiment of the present technology, the metadata of a target item is expanded using the metadata of other items to which a responder has shown a response, the responder being a user having shown a response to the target item of which the metadata is to be expanded.

According to an embodiment of the present technology, it is possible to adequately expand the metadata of an item.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 6 is a diagram showing an example of item feature amounts;

FIG. 7 is a diagram showing an example of users' purchase histories;

DETAILED DESCRIPTION OF EMBODIMENTS

Next, a mode (hereinafter referred to as an embodiment) for carrying out the present technology will be described. Note that the description will be given in the following order.
1. Embodiment
2. Modified Examples 1. Embodiment Configuration Example of Information Processing Apparatus 11

Figure 1:
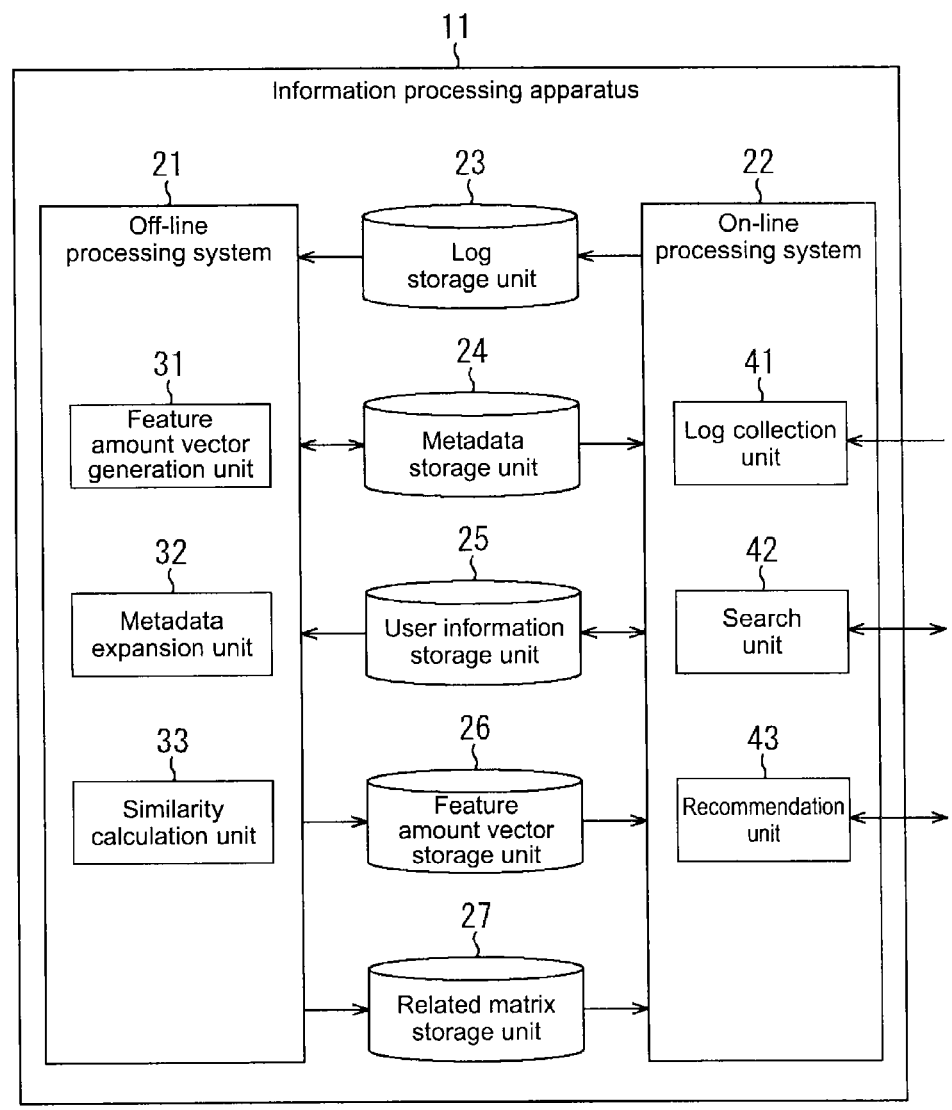
FIG. 1 is a block diagram showing an embodiment of an information processing apparatus to which the present technology is applied.

FIG. 1 is a block diagram showing an embodiment of an information processing apparatus 11 to which the present technology is applied.

The information processing apparatus 11 is an apparatus that provides the recommendation and search services of items. Note that the items recommended or searched by the information processing apparatus 11 are not limited to the specific types of items. For example, various contents and commercial products such as moving images, still images, books, documents, songs, TV programs, software, news articles, blog articles, microblog sentences, and information; users in community sites; and communities inside community sites, are assumed. In addition, the information processing apparatus 11 is capable of recommending and searching for parts of items (for example, one scene of a movie or a catchy part of a song).

The information processing apparatus 11 includes an off-line processing system 21, an on-line processing system 22, a log storage unit 23, a metadata storage unit 24, a user information storage unit 25, a feature amount vector storage unit 26, and a related matrix storage unit 27.

The off-line processing system 21 includes a feature amount vector generation unit 31, a metadata expansion unit 32, and a similarity calculation unit 33.

As will be described later, the feature amount vector generation unit 31 generates a feature amount vector expressing the feature of each item based on the metadata of the item stored in the metadata storage unit 24. The feature amount vector generation unit 31 stores the generated feature amount vector of each item in the feature amount vector storage unit 26.

As will be described later, the metadata expansion unit 32 expands the feature amount vector of each item stored in the feature amount vector storage unit 26 using the feature amount vectors of other items to expand the metadata of the item. The metadata expansion unit 32 stores the expanded feature amount vector in the feature amount vector storage unit 26.

As will be described later, the similarity calculation unit 33 calculates the similarity between respective items based on feature amount vectors stored in the feature amount vector storage unit 26. In addition, the similarity calculation unit 33 generates a related matrix expressing the similarity between respective items in a table form and stores the same in the related matrix storage unit 27.

The on-line processing system 22 includes a log collection unit 41, a search unit 42, and a recommendation unit 43.

The log collection unit 41 collects information on the response of each user to each item from a server and a client connected via a network such as the Internet (not shown). Note that the type of the response to be collected is not particularly limited. For example, a response for purchasing, reserving, and downloading an item, a response for browsing information, and a response for making an evaluation or a comment are set as such.

The log collection unit 41 generates a log (hereinafter referred to as a response log) expressing the history of the response of each user to each item based on collected information and stores the same in the log storage unit 23. For example, the response log includes the user ID of a user having shown a response, the item ID of an item as a response target, a response period, a response type, or the like.

As will be described later, the search unit 42 searches for an item corresponding to given conditions based on the feature amount vector of each item stored in the feature amount vector storage unit 26. The search unit 42 transmits the search result of the item to a client or the like operated by a user via a network (not shown).

As will be described later, the recommendation unit 43 extracts an item to be recommended to a user based on a related matrix stored in the related matrix storage unit 27. The recommendation unit 43 transmits information on the extracted item to a client or the like operated by a user via a network (not shown).

The log storage unit 23 stores a response log as described above.

The metadata storage unit 24 stores the metadata of each item. Note that the metadata may include any type of information so long as it is related to the item. In addition, the format of the metadata is not particularly limited but may have any type.

The user information storage unit 25 stores user information on a user receiving a service provided by the information processing apparatus 11. Note that the user information includes, for example, a user's attribute such as an age, a gender, an address, and an occupation.

The feature amount vector storage unit 26 stores the feature amount vector of each item as described above.

The related matrix storage unit 27 stores a related matrix as described above.

(Processing of Information Processing Apparatus 11)

Next, the processing of the information processing apparatus 11 will be described.

(Off-Line Processing)

Figure 2:
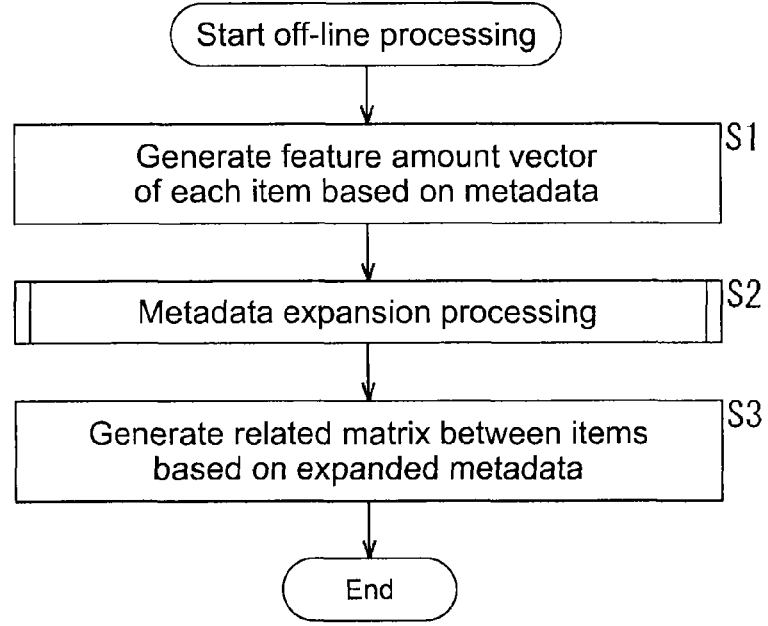
FIG. 2 is a flowchart for describing off-line processing.

First, off-line processing executed by the information processing apparatus 11 will be described with reference to the flowchart of FIG. 2. Note that the processing is executed on, for example, a periodic basis.

In step S1, the feature amount vector generation unit 31 generates the feature amount vector of each item based on metadata. That is, the feature amount vector generation unit 31 generates the feature amount vector in which the metadata of each item is vectorized and stores the same in the feature amount vector storage unit 26.

Note that any method is available as a method of generating a feature amount vector from metadata but an example of the method will be described briefly.

First, the feature amount vector generation unit 31 extracts an attribute value for each prescribed attribute from metadata. Here, the attribute classifies the features of an item according to its properties, and examples of the attribute include parameters such as a genre, a writer, and a keyword. In addition, the attribute value represents a value indicating specific information on each attribute. For example, when an item is a TV program, the attribute value of the attribute "genre" includes action, comedy, melodrama, sports, news, variety program, non-fiction, or the like.

Next, using any method such as TF-IDF (Term Frequency-Inverse Document Frequency), the feature amount vector generation unit 31 calculates a score expressing the influence or importance of each of the extracted attribute values. Further, the combination of the attribute values and the scores becomes equivalent to an item feature amount expressing the feature of the item.

Then, the feature amount vector generation unit 31 generates a feature amount vector expressing the item feature amount in a vector form. That is, the feature amount vector is a combined vector in which the vectors of the respective attributes (attribute vectors) are combined together. The attribute values are components (coordinate axes) constituting the attribute vectors, and the scores of the respective attribute values express the sizes of the components of the attribute values.

Note that the details of the method of generating a feature amount vector are disclosed in, for example, Japanese Patent Application Laid-open No. 2011-135183.

Figure 3:
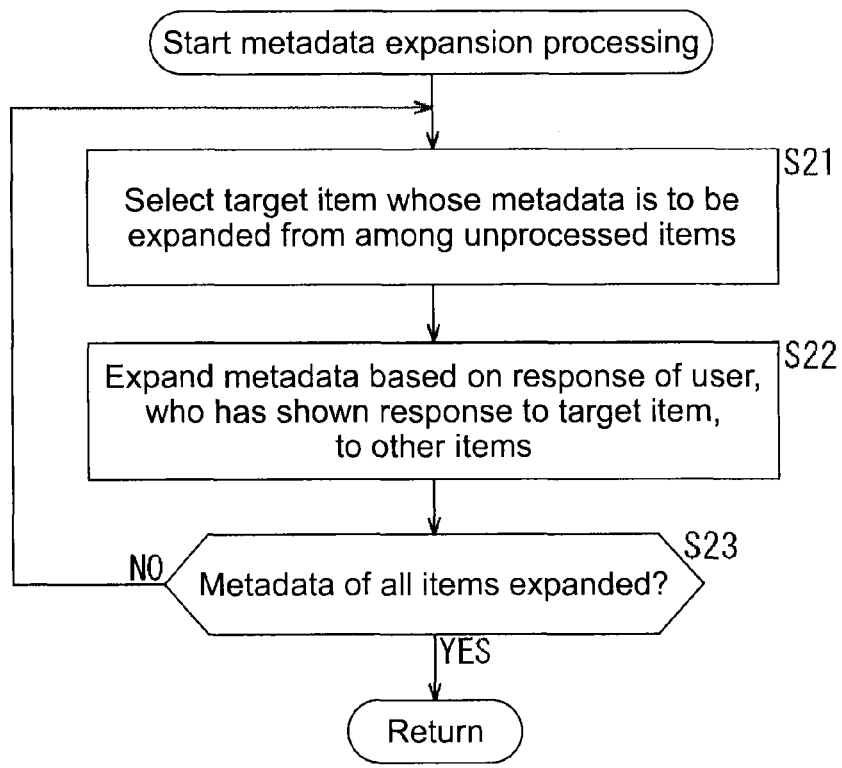
FIG. 3 is a flowchart for describing the details of metadata expansion processing.

In step S2, the metadata expansion unit 32 executes metadata expansion processing. Here, the details of the metadata expansion processing will be described with reference to the flowchart of FIG. 3.

In step S21, the metadata expansion unit 32 selects a target item of which the metadata is to be expanded from among unprocessed items.

In step S22, the metadata expansion unit 32 expands the metadata based on the response of a user to other items, the user having shown a response to the target item. Then, the metadata expansion unit 32 stores the feature amount vector of the target item after being expanded (hereinafter referred to as the expanded feature amount vector) in the feature amount vector storage unit 26.

Specifically, using a response log stored in the log storage unit 23, the metadata expansion unit 32 calculates an expanded feature amount vector $qe_i$, in which a feature amount vector $q_i$ of a target vector i is expanded, according to the following Expression (1).

(Expression 1)

$$qe_i = \Sigma_v^M \{ p_{i,v} \Sigma_k^N (p_{k,v} q_k) \} \quad (1)$$

Note that $q_k$ expresses the feature amount vector of an item k, M expresses the number of users, and N expresses the number of items.

In addition, $p_{k,v}$ expresses the presence or absence of the response of a user v to the item k. For example, $p_{k,v}$ is set at 0 when the user v has not shown a response to the item k and is set at 1 when the user v has shown a response to the item k.

Accordingly, the expanded feature amount vector $qe_i$ becomes equivalent to a vector in which the feature amount vectors of other items, to which the user having shown a response to the item i (hereinafter referred to as a reactor to the item i) has shown a response, are added together (the sum of the feature amount vectors). Thus, the metadata of the item i is expanded by the metadata of the other items to which the reactor to the item i has shown a response.

Note that a determination criterion as to whether a user has shown a response to an item is set differently depending on an item type. For example, for some types of items, only "purchase" is regarded as a response to the items. While, for other types of items, "purchase," "information viewing," and "making an evaluation" are regarded as responses to the items.

Here, a specific example of the processing of step S22 will be described with reference to FIG. 4.

Figure 4:
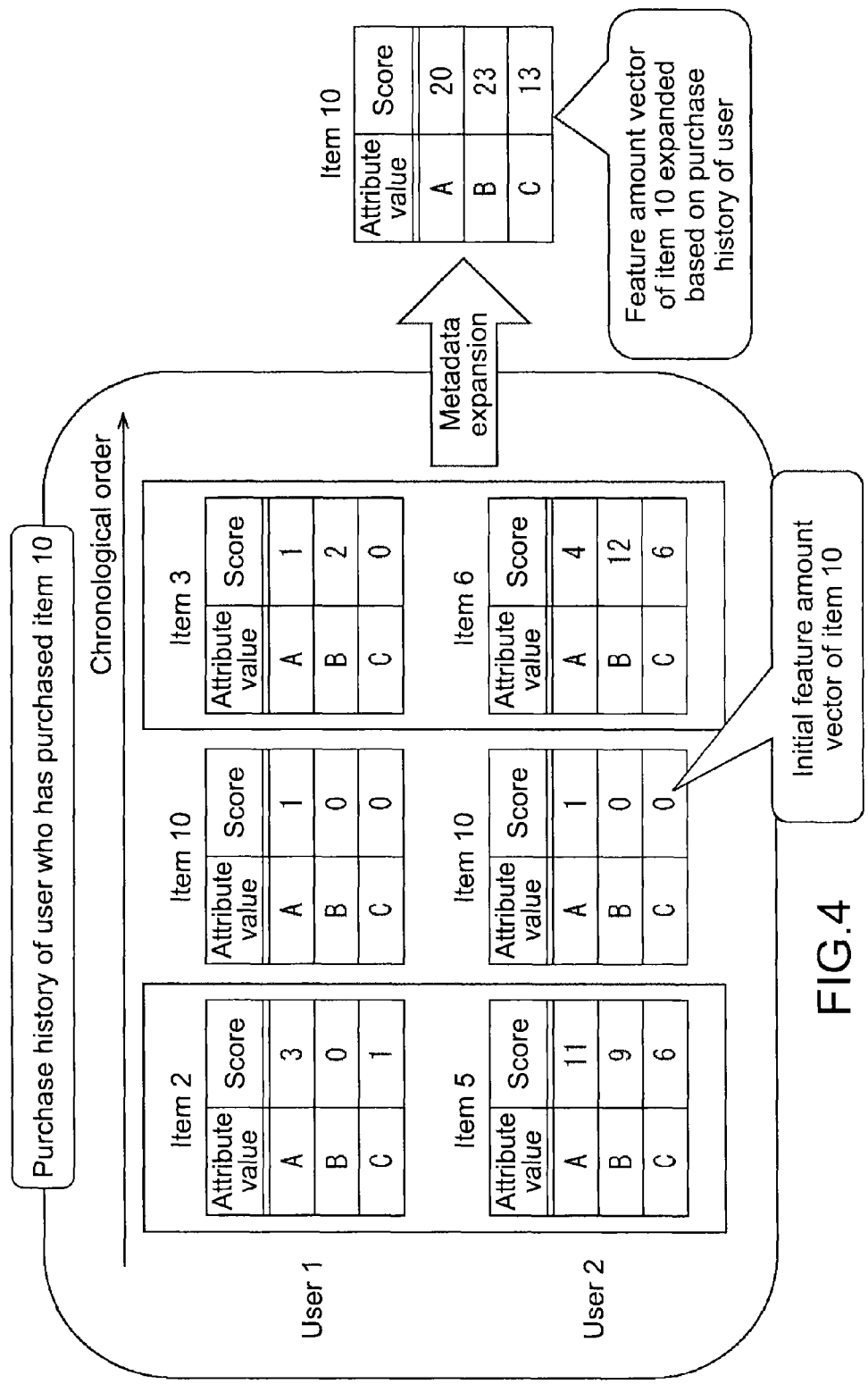
FIG. 4 is a diagram for describing a specific example of the metadata expansion processing.

FIG. 4 shows an example of a case in which the metadata of an item 10 is expanded based on the purchase history of a user who has purchased the item 10. The item 10 has been purchased by a user 1 and a user 2. Besides, the user 1 has purchased an item 2 and an item 3, and the user 2 has purchased an item 5 and an item 6. Each of the items includes a feature amount vector composed of attribute values A to C and the scores of the attribute values.

For example, when the feature amount vector of the item 10 is expanded, the feature amount vectors of the other items purchased by the user 1 and the user 2 who have purchased the item 10 are added to the feature amount vector of the item 10 according to the Expression (1). That is, the sum of the feature amount vectors of the items 2, 3, 5, 6, and 10 becomes equivalent to the expanded feature amount vector of the item 10.

Thus, the scores of the attribute values A, B, and C of the feature amount vector of the item 10 are changed from 1, 0, and 0, which are the attribute values of the item 10 before being expanded, to 20, 23, and 13, respectively. As described above, the feature amount vector of the item 10 is expanded by the feature amount vectors of the items 2, 3, 5, and 6. As a result, the metadata of the item 10 is indirectly expanded by the metadata of the items 2, 3, 5, and 6.

Note that $p_{k,v}$ in the Expression (1) may be set at a variable amount within a prescribed range instead of a binary number of 0 or 1 and used as a weight for adding feature amount vectors together. That is, $p_{k,v}$ may be used as a weight determined by the combination of the user v, the item k, and (information on) a response.

For example, $p_{k,v}$ may be set at a value (weight) corresponding to at least one of a response type and a response degree. For example, $p_{k,v}$ may be set in the range of 0 to 1 for each type of a response to the item k or may be set in the range of 0 to 1 according to the positive degree of a response to the item k. Here, the positive degree represents, for example, the degree of a user's preference, interest, evaluation, or the like with respect to the item. On the other hand, for example, when a response to the item k is negative, may be set at a negative value of a size corresponding to the negative degree of the response.

The expanded feature amount vector $q_{ei}$ in a case in which $p_{k,v}$ is used as a weight is one in which the feature amount vectors of other items, to which the reactor of the item i has shown a response, are added together according to a response type, a response degree, or the like. Thus, the expanded feature amount vector $g_{ei}$ is such that the metadata of the item i is expanded by the metadata of other items, to which the reactor of the item i has shown a response, according to a response type, a response degree, or the like.

Note that when the weight $p_{k,v}$ may not express a specific user and a specific item, it will merely be expressed as a weight p in some cases.

Referring back to FIG. 3, the metadata expansion unit 32 determines in step S23 whether the metadata of all the items has been expanded. When it is determined that the metadata of all the items has not been expanded, the processing is returned to step S21.

After that, the processing of steps S21 to S23 is repeatedly executed until it is determined in step S23 that the metadata of all the items has been expanded. Thus, the feature amount vectors of all the items are expanded, which results in the metadata of all the items being expanded.

On the other hand, when it is determined in step S23 that the metadata of all the items has been expanded, the metadata expansion processing is ended.

Referring back to FIG. 2, the similarity calculation unit 33 generates the related matrix between the items based on the expanded metadata in step S3. Specifically, the similarity calculation unit 33 calculates the similarity between the respective items based on the expanded feature amount vectors of the items. The following Expression (2) indicates an example of calculating the similarity $sim_{i,j}$ between an item i and an item j.

(Expression 2)

$$simA_{i,j} = \frac{qe_i}{|qe_i|} \cdot \frac{qe_j}{|qe_j|} \qquad (2)$$

$$= \frac{\sum_v^M \left\{ p_{i,v} \sum_k^N (p_{k,v} q_k) \right\}}{\left| \sum_v^M \left\{ p_{i,v} \sum_k^N (p_{k,v} q_k) \right\} \right|} \cdot \frac{\sum_v^M \left\{ p_{j,v} \sum_k^N (p_{k,v} q_k) \right\}}{\left| \sum_v^M \left\{ p_{j,v} \sum_k^N (p_{k,v} q_k) \right\} \right|}$$

That is, the similarity $simA_{i,j}$ is calculated by the inner product of a vector obtained by normalizing an expanded feature amount vector $qe_i$ of the item i and a vector obtained by normalizing an expanded feature amount vector $qe_j$ of the item j (i.e., it is calculated by the distance between the vectors). Accordingly, the similarity $simA_{i,j}$ expresses the similarity between the expanded feature amount vector $qe_i$ and the expanded feature amount vector $qe_j$.

Note that the method of normalizing the vectors is not limited to the one indicated by the Expression (2) but any method is available. For example, it is also possible to normalize the vectors such that the sum of the respective elements of the vectors becomes 1 or normalize the vectors such that the size of an L2 norm becomes 1.

Note that when the similarity $simA_{i,j}$ may not express the relationship between specific items, it will merely be expressed as similarity simA in some cases.

The similarity calculation unit 33 calculates the similarity simA between the respective items for the combinations of all the items. Then, the similarity calculation unit 33 generates a related matrix expressing the similarity simA between the respective items in a table form and stores the same in the related matrix storage unit 27.

After that, the off-line processing is ended.

As described above, the metadata of each item may adequately be expanded by the metadata of other items.

(Item Recommendation Processing)

Figure 5:
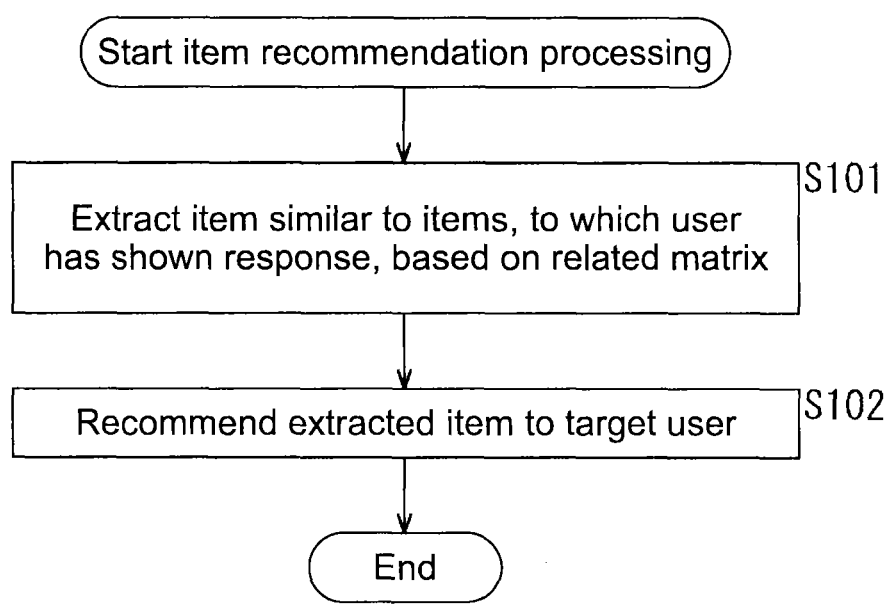
FIG. 5 is a flowchart for describing item recommendation processing.

Next, item recommendation processing executed by the information processing apparatus 11 will be described with reference to the flowchart of FIG. 5. Note that the processing is started, for example, when a request for recommending an item from a client operated by a user (hereinafter referred to as a target user) is transmitted to the recommendation unit 43.

In step S101, the recommendation unit 43 extracts an item similar to items, to which a target user has shown a response, based on a related matrix. Specifically, for each candidate item as a candidate to be recommended to the target user, the recommendation unit 43 calculates a score indicating the predictive value of the preference of the target user based on the similarity simA between respective items stored in the related matrix. Note that the candidate item is selected from among the items to which the target user has not shown a response.

The following Expression (3) shows an example of the method of calculating a score $scA_{i,u}$ indicating the predictive value of the preference of a target user u for a candidate item i.

(Expression 3)

$$ScA_{i,u} = \sum_j^N p_{j,u} \cdot sim_{i,j} \qquad (3)$$

$$= \sum_j^N p_{j,u} \left( \frac{\sum_v^M \left\{ p_{i,v} \sum_k^N (p_{k,v} q_k) \right\}}{\left| \sum_v^M \left\{ p_{i,v} \sum_k^N (p_{k,v} q_k) \right\} \right|} \cdot \frac{\sum_v^M \left\{ p_{j,v} \sum_k^N (p_{k,v} q_k) \right\}}{\left| \sum_v^M \left\{ p_{j,v} \sum_k^N (p_{k,v} q_k) \right\} \right|} \right)$$

That is, the score $scA_{i,u}$ is one obtained by adding together the similarity $simA_{i,j}$ between the candidate item i and respective items j to which the user u has shown a response. Accordingly, the score $scA_{i,u}$ expresses similarity in the expanded feature amount vector (i.e., the expanded metadata) between the candidate item i and a group of the items to which the user u has shown a response.

Note that when the score $scA_{i,u}$ may not express a specific user and a specific item, it will merely be expressed as a score scA in some cases.

Then, the recommendation unit 43 extracts a recommendation item to be recommended to the target user from the candidate items based on the score scA. For example, the recommendation unit 43 extracts an item having the score scA of a prescribed threshold or greater as a recommendation item. Alternatively, the recommendation unit 43 extracts, for example, a prescribed number of items as recommendation items in descending order of the score scA.

Accordingly, an item having an expanded feature amount vector (i.e., expanded metadata) similar to those of a group of items to which a target user has shown a response is extracted as a recommendation item.

Note that in the above Expression (3), both the candidate item i and the items j to which the user u has shown a response use the expanded feature amount vector. However, it is possible for one of the candidate item i and the items j to use the feature amount vector before being expanded. That is, it is possible for one of the candidate item i and the items j to which the user u has shown a response to use metadata before being expanded to calculate the score $scA_{i,u}$.

Note that the effectiveness of using an expanded feature amount vector for both items or one of the items is changed depending on conditions such as the types of the items and determined by, for example, an experiment.

In step S102, the recommendation unit 43 recommends the extracted item to the target user. For example, the recommendation unit 43 transmits information on the extracted recommendation item to the client as a requester. Thus, the information on the extracted recommendation item is provided to the target user.

After that, the item recommendation processing is ended.

Figures 8, 9:
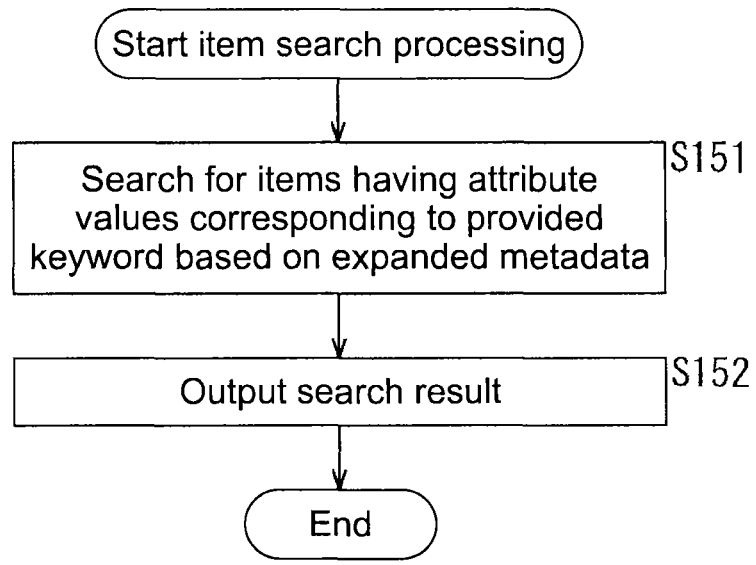
FIG. 8 is a diagram showing an example of comparing the results of calculating the similarity between items with the present technology and with CBF and CF.
FIG. 9 is a flowchart for describing item search processing.

Here, the results of calculating the similarity between items with the present technology and with CBF and CF in the related art are compared with reference to FIGS. 6 to 8.

For example, when an item is recommended by the CBF, the similarity $simB_{i,j}$ between an item i and an item j is calculated according to the following Expression (4).

(Expression 4)

$$simB_{i,j} = q_i \cdot q_j \quad (4)$$

That is, the similarity $simB_{i,j}$ is calculated by the inner product of the feature amount vector $q_i$ of the item i and the feature amount vector $q_j$ of the item j (i.e., it is calculated by the distance between the vectors).

In addition, when an item is recommended by the CBF, a score $scB_{i,u}$ indicating the predictive value of the preference of a target user u with respect to an item i is calculated according to the following Expression (5).

(Expression 5)

$$ScB_{i,u} = \sum_{j}^{N} p_{j,u} \cdot simB_{i,j} \quad (5)$$

$$= \sum_{j}^{N} p_{j,u}(q_i \cdot q_j)$$

$$= \left(\sum_{j}^{N} p_{j,u} q_j\right) \cdot q_i$$

That is, the score $scB_{i,u}$ is one obtained by adding together the similarity $simB_{i,j}$ between the item i and each of the items j to which the user u has shown a response.

On the other hand, when an item is recommended by the CF, the similarity $simC_{i,j}$ between an item i and an item j is calculated according to the following Expression (6).

(Expression 6)

$$simC_{i,j} = \frac{\sum_{v}^{M} p_{i,v} \cdot p_{j,v}}{\sum_{v}^{M} p_{i,v} + \sum_{v}^{M} p_{j,v} - \sum_{v}^{M} p_{i,v} \cdot p_{j,v}} \quad (6)$$

That is, the similarity $simC_{i,j}$ indicates a proportion at which a user having shown a response to the item i and a user having shown a response to the item j are overlapped.

In addition, when an item is recommended by the CF, a score $scC_{i,u}$ indicating the predictive value of a target user u with respect to an item i is calculated according to the following Expression (7).

(Expression 7)

$$scC_{j,u} = \sum_{j}^{N} p_{j,u} \cdot simC_{i,j} \quad (7)$$

$$= \sum_{j}^{N} p_{j,u} \frac{\sum_{v}^{M} p_{i,v} \cdot p_{j,v}}{\sum_{v}^{M} p_{i,v} + \sum_{v}^{M} p_{j,v} - \sum_{v}^{M} p_{i,v} \cdot p_{j,v}}$$

That is, the score $scC_{i,u}$ is one obtained by adding together the similarity $simC_{i,j}$ between the item i and each of the items j to which the user u has shown a response.

Note that when the similarity $simB_{i,j}$ and the similarity $simC_{i,j}$ may not express the relationship between specific items, they will merely be expressed as similarity B and similarity C, respectively, in some cases.

FIG. 8 shows the results of calculating the similarity simA with the present technology, the similarity simB with the CBF, and the similarity simC with the CF based on the item feature amounts of FIG. 6 and the purchase histories of FIG. 7.

Specifically, FIG. 6 shows an example of the item feature amounts of items 1 to 6. The items 1 to 6 are given the item feature amounts composed of attribute values 1 to 14 and the scores of the attribute values. Each of the scores is set at 0 (blank column) or 1. That is, it is expressed that each of the scores does not have a corresponding attribute value (0) or has a corresponding attribute value (1). For example, the item 1 has the attribute values 1, 3, 11, and 12, and the item 2 has the attribute values 3, 8, and 9.

FIG. 7 shows an example of the purchase histories of the items 1 to 6 of users 1 to 6. Columns having a value of 1 indicate that the users have purchased corresponding items, and blank columns indicate that the users have not purchased corresponding items. For example, the user 1 has purchased the items 3 and 5, and the user 2 has purchased the items 2 and 5.

Using the item feature amounts of FIG. 6 and the purchase histories of FIG. 7, FIG. 8 shows the results of calculating the similarity simA (Expression (2)), the similarity simB (Expression (4)), and the similarity simC (Expression (6)) between the item 1 and the other items.

For example, since the items 1 and 5 do not have a corresponding attribute value, the value of the similarity simB between the items 1 and 5 becomes 0. As described above, in the application of the CBF, an item such as a new item and a UGC (User Generated Content) having a small amount of metadata has only a few parts common to the metadata of other items. Therefore, the similarity between such an item and the other items is likely to be reduced. Accordingly, an item having a small amount of metadata is less likely to be recommended to a user, and accuracy for recommending the item is reduced. In addition, for an item having a small amount of metadata, information based on the purchase tendency of a user having purchased the item may not be sufficiently used for the recommendation of the item.

In addition, for example, since purchasers are not overlapped between the items 1 and 2 and between the items 1 and 4, the value of the similarity simC between these items becomes 0. As described above, in the application of the CF, an item such as a new item purchased by a few purchasers (item having a less purchase history) has only a small number of purchasers overlapped with other items. Therefore, the similarity between such an item and the other items is likely to be reduced. Accordingly, an item purchased by a few purchasers is less likely to be recommended to a user, and accuracy for recommending the item is reduced. In addition, for an item purchased by a few purchasers, information included in metadata given to the item may not be sufficiently used for the recommendation of the item.

In the application of the present technology, even for the items 1 and 5 having no corresponding attribute value, the similarity simA may be calculated using the metadata (attribute values) of other items purchased by the user who has purchased the items 1 and 5.

In addition, even for the items 1 and 2 for which the purchasers are not overlapped, the similarity simA may be calculated using the metadata (attribute values) of other items purchased by the user who has purchased the items 1 and 2. Same applies to the items 1 and 4 for which the purchased users are not overlapped.

Accordingly, with the application of the present technology, it becomes possible to calculate similarity with other items even for an item having a small amount of metadata or an item having a few response logs such as a purchase history and to recommend such an item to a user with high accuracy.

(Item Search Processing)

Next, item search processing executed by the information processing apparatus 11 will be described with reference to the flowchart of FIG. 9. The processing is started, for example, when a keyword used for conducting a search is provided to the search unit 42.

In step S151, the search unit 42 searches for items having attribute values corresponding to a provided keyword based on expanded metadata. For example, the search unit 42 searches for items in which the scores of the attribute values corresponding to the keyword of the expanded feature amount vectors in the respective items stored in the feature amount vector storage unit 26 are greater than 0.

In step S152, the search unit 42 outputs a search result. For example, the search unit 42 outputs as the search result the items searched in step S151, which are arranged in descending order of the scores of the attribute values corresponding to the keyword, to the requester of the search result.

After that, the search processing is ended.

Thus, it becomes possible to search for items based on not only metadata initially given to the items but metadata expanded based on the metadata of other items. More specifically, for example, it becomes possible to search for items including a provided keyword in the expanded metadata thereof. As a result, it becomes possible to improve search accuracy and search for more items.

Note that it is also possible to display a keyword (for example, an attribute value) included in expanded metadata together with searched items according to a method such as a tag cloud.

2. Modified Examples

Hereinafter, modified examples of the above embodiment of the present technology will be described.

First Modified Example: Modified Example of Response Log Used for Expansion of Metadata (Feature Amount Vector)

The above Expression (1) describes the example in which all the feature amount vectors of the other items, to which the responder v of the item i (target item) has shown a response, are added together when the feature amount vector of the item i is expanded. That is, the Expression (1) describes the example in which all response logs of all the users are used to expand the metadata of the item i. Contrary to this, the range of the response logs to be used may be limited to expand the metadata of the item i.

For example, the period of a response log to be used may be limited. For example, only a response log within a prescribed period including a period in which a responder has shown a response to a target item (such as a prescribed period before and after the period in which the responder has shown a response to the target item) may be used. Thus, the metadata of a target item may be expanded using only the metadata of an item to which a responder has shown a response within a prescribed period including a period in which the responder has shown a response to the target item.

Alternatively, for example, only a prescribed number of response logs to which a responder has shown a response immediately before or after having shown a response to a target item may be used. Thus, the metadata of a target item may be expanded using only the metadata of a prescribed number of items to which a responder has shown a response immediately before or after having shown a response to the target item.

Generally, for example, it is assumed that a user is likely to purchase a related item or show an interest in a related item at the same period. That is, the user has a tendency to show an interest in a similar item at the same period. Therefore, the period of a response log to be used is limited as described above, whereby metadata may be expanded using only an item highly likely to be similar to a target item.

In addition, for example, the range of the user of a response log to be used may be limited. For example, a user may be classified into any of a plurality of groups using the attribute (such as an age, a gender, a nationality, and an occupation) of the user or clustering based on a purchase tendency or the like, and only the response log of the user belonging to a prescribed group may be used. As a result, the metadata of a target item may be expanded by limiting a responder to a user belonging to a prescribed group.

Thus, the metadata of a target item may be expanded based on the viewpoint (such as a behavior and a value) of a user belonging to a specific group. In addition, it becomes possible to expand the metadata of a target item based on a plurality of viewpoints for each user's group and adequately use the metadata according to circumstances.

For example, it is assumed that the metadata of an item is separately expanded for each user's generation and adequately use the expanded metadata according to the age of the user to which the item is to be recommended. In addition, for example, when an item is recommended to the user of a certain generation, the metadata of the item unsuitable for the user of the generation may be prevented from being expanded.

Moreover, the range of the item of a response log to be used may be limited. For example, an item may be classified into any of a plurality of groups by a prescribed method using the attribute (such as a genre) of the item or clustering, and only a response log corresponding to the item of a group to which a target item belongs may be used. Thus, the metadata of a target item may be expanded using the metadata of an item belonging to the same group as the target item.

For example, even an item to which the same user has shown a response is highly likely to have a different property if it belongs to a different genre. Therefore, for example, only a response log corresponding to an item belonging to the same genre as a target item may be used, and the response log of an item belonging to a different genre from the target item may not be used. Thus, the metadata of a target item may be expanded using the metadata of an item belonging to the same genre as the target item.

Second Modified Example: Modified Example of Weight p Used for Expansion of Metadata (Feature Amount Vector)

The above description shows the example in which the weight p in the Expression (1) is set based on a response type or a response degree. However, the weight p may be set using other conditions.

For example, the weight p for an item to which a responder has shown a response in a period close to a period in which the responder has shown a response to a target item may be increased. For example, the weight p for an item to which a responder has shown a response in a period close to a period in which the responder has shown a response to the target item may be further increased, while the weight p for an item to which the responder has shown a response in a period away from the period in which the responder has shown the response to the target item may be further decreased.

In addition, for example, the weight p may be set for each responder. More specifically, for example, the weight p may be set according to a group to which a responder belongs. For example, it is assumed that the weight p for a responder belonging to a group of responders in the twenties may be made greater or smaller than the weight p for responders belonging to groups of the responders in other ages. Thus, the metadata of a target item may be expanded by placing significance on or paying little attention to the metadata of an item to which a specific user has shown a response.

Moreover, for example, the weight p may be set according to the number of items to which a responder has shown a response. For example, the weight p for a user who has shown a response to a greater number of items may be set at a small value, while the weight p for a user who has shown a response to a smaller number of items may be set at a great value. Specifically, for example, it is assumed that the weight p for a user who has shown a response to n items may be set at 1/n. Thus, the influence of a user who has shown a response to a great number of items (for example, a heavy user) may be prevented from being excessive when metadata is expanded.

Furthermore, for example, the weight p for an item similar to a target item may be increased. For example, the weight p for an item in a genre same as or similar to a target item may be made greater than the weight p for items in other genres. Thus, the metadata of a target item may be expanded by placing significance on the metadata of an item similar to the target item.

Furthermore, for example, the weight p for a target item may be set at a value different from those of the weights p for other items. For example, the weight p for a target item may be made greater than the weights p for other items.

Alternatively, for example, the weight p for a target item may be set at 0 such that the feature amount vector of the target item itself is not added when the feature amount vector of the target item is expanded. Thus, the metadata of a target item itself is not used to expand the metadata of the target item.

Note that the use of the feature amount vector of a target item itself or the weight p for the target item is changed according to conditions such as an item type and determined by an experiment or the like.

Third Modified Example: Other Modified Examples

For example, the metadata of a target item may be first expanded using the metadata of other items to which the responder of the target item has shown a response, and then a feature amount vector may be generated based on the expanded metadata.

Note that the above respective modified examples may be used in combination as occasion demands.

Configuration Example of Computer

The above series of processing may be executed not only by hardware but by software. When the series of processing is executed by software, a program constituting the software is installed in a computer. Here, the examples of the computer include a computer incorporated in dedicated hardware and a general-purpose personal computer capable of executing various functions with various programs installed therein.

Figure 10:
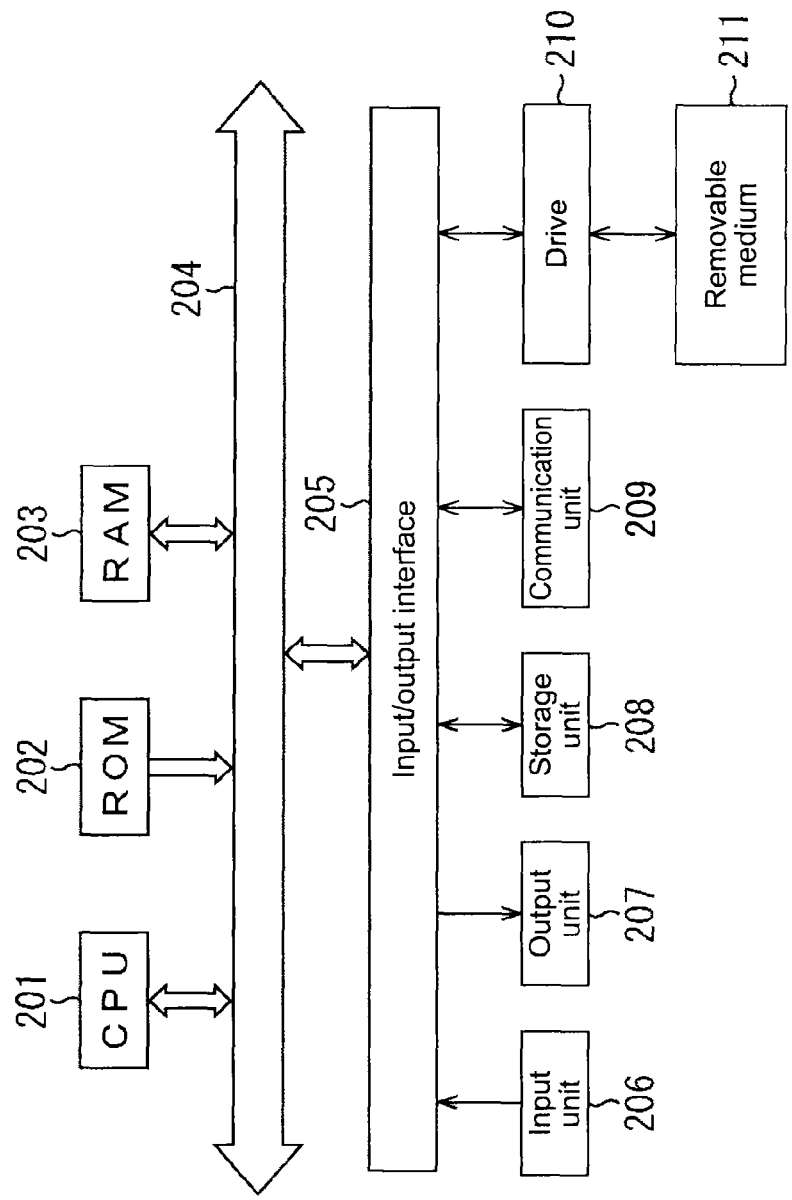
FIG. 10 is a block diagram showing a configuration example of a computer.

FIG. 10 is a block diagram showing a configuration example of the hardware of a computer that executes the above series of processing with a program.

In the computer, a CPU (Central Processing Unit) 201, a ROM (Read Only Memory) 202, and a RAM (Random Access Memory) 203 are connected to one another by a bus 204.

The bus 204 is also connected to an input/output interface 205. The input/output interface 205 is connected to an input unit 206, an output unit 207, a storage unit 208, a communication unit 209, and a drive 210.

The input unit 206 includes a keyboard, a mouse, a microphone, or the like. The output unit 207 includes a display, a speaker, or the like. The storage unit 208 includes a hard disk drive, a non-volatile memory, or the like. The communication unit 209 includes a network interface or the like. The drive 210 drives a removable medium 211 such as a magnetic disk, an optical disk, a magnet-optical disk, and a semiconductor memory.

In the computer thus configured, the above series of processing is executed, for example, when the CPU 201 loads a program stored in the storage unit 208 into the RAM 203 and executes the same via the input/output interface 205 and the bus 204.

For example, the program to be executed by the computer (CPU 201) may be provided in a state of being recorded on the removable medium 211 serving as a package medium or the like. In addition, the program may be provided via a wired or wireless transmission medium such as a local area network, the Internet, and digital satellite broadcasting.

In the computer, the program may be installed in the storage unit 208 via the input/output interface 205 when the removable medium 211 is attached to the drive 210. In addition, the program may be received by the communication unit 209 via a wired or wireless transmission medium and installed in the storage unit 208. Besides, the program may be installed in advance in the ROM 202 or the storage unit 208.

Note that the program to be executed by the computer may be a program to be executed chronologically in the order described in the specification or may be a program to be executed in parallel or at adequate timing such as when the program is invoked.

In addition, in the specification, a system represents a set of a plurality of constituents (such as an apparatus and modules (parts)), and all the constituents may not be incorporated in the same housing. Accordingly, any of a plurality of apparatuses accommodated in different housings and connected to one another via a network and an apparatus having a plurality of modules accommodated in a housing is defined as a system.

Moreover, the embodiment of the present technology is not limited to the above one but may be modified in various ways without departing from the spirit of the present technology.

For example, the present technology may have the configuration of cloud computing in which a function is shared and cooperatively processed by a plurality of apparatuses via a network.

In addition, each of the steps described in the above flowcharts may be shared and executed not only by an apparatus but by a plurality of apparatuses.

Moreover, when a step includes a plurality of processing, the plurality of processing included in the step may be shared and executed not only by an apparatus but by a plurality of apparatuses.

Furthermore, the present technology may employ, for example, the following configurations.

(1) An information processing apparatus, including:
a metadata expansion unit configured to expand metadata of a target item using metadata of other items to which a responder has shown a response, the responder being a user having shown a response to the target item of which the metadata is to be expanded.

(2) The information processing apparatus according to (1), in which
the metadata expansion unit is configured to expand the metadata of the target item using metadata of an item to which the responder has shown a response within a prescribed period including a period in which the responder has shown the response to the target item.

(3) The information processing apparatus according to (1), in which
the metadata expansion unit is configured to expand the metadata of the target item using metadata of a prescribed number of items to which the responder has shown a response immediately before or after having shown the response to the target item.

(4) The information processing apparatus according to any one of (1) to (3), in which
the metadata expansion unit is configured to limit the responder to a user belonging to a prescribed group to expand the metadata of the target item.

(5) The information processing apparatus according to any one of (1) to (4), in which
the metadata expansion unit is configured to expand the metadata of the target item using metadata of an item belonging to a same group as the target item when the respective items are classified by a prescribed method.

(6) The information processing apparatus according to any one of (1) to (5), in which
the metadata expansion unit is configured to expand the metadata of the target item in such a way that feature amount vectors based on the metadata of the respective items to which the responder has shown the response are added together.

(7) The information processing apparatus according to (6), in which
the metadata expansion unit is configured to increase a weight for an item, to which the responder has shown a response in a period close to a period in which the responder has shown the response to the target item, to add the feature amount vectors together.

(8) The information processing apparatus according to (6) or (7), in which
the metadata expansion unit is configured to assign a weight corresponding to at least one of a response type and a response degree to add the feature amount vectors together.

(9) The information processing apparatus according to any one of (6) to (8), in which
the metadata expansion unit is configured to assign a weight to the responder to add the feature amount vectors together.

(10) The information processing apparatus according to (9), in which
the metadata expansion unit is configured to assign a weight corresponding to the number of the items, to which the responder has shown the response, to add the feature amount vectors together.

(11) The information processing apparatus according to any one of (6) to (10), in which
the metadata expansion unit is configured to increase a weight for an item similar to the target item to add the feature amount vectors together.

(12) The information processing apparatus according to any one of (6) to (11), in which
the metadata expansion unit is configured to set a weight for the feature amount vector of the target item at a value different from a value of a weight for the feature amount vectors of the other items.

(13) The information processing apparatus according to any one of (6) to (11), in which
the metadata expansion unit is configured not to add the feature amount vector of the target item.

(14) The information processing apparatus according to any one of (6) to (13), further including:
a recommendation unit configured
to calculate, for each candidate item as a candidate item to be recommended to a target user, a score obtained by adding together similarity in the feature amount vector between the candidate item and respective items to which the target user has shown a response, and
to recommend the item to the target user based on the score, in which
at least one of the candidate item and the items to which the target user has shown the response uses the expanded feature amount vector to calculate the score.

(15) The information processing apparatus according to any one of (1) to (14), further including:
a search unit configured to search for an item including a provided keyword in expanded metadata thereof.

(16) An information processing method of an information processing apparatus, the method including:
expanding metadata of a target item using metadata of other items to which a responder has shown a response, the responder being a user having shown a response to the target item of which the metadata is to be expanded.

(17) A program for causing a computer to execute processing including:
expanding metadata of a target item using metadata of other items to which a responder has shown a response, the responder being a user having shown a response to the target item of which the metadata is to be expanded.

What is claimed is:

1. An information processing apparatus, comprising:
    circuitry configured to:
        identify a responder of a target item stored in a storage, the responder having shown a response to the target item;
        identify one or more other items to which the identified responder has shown a corresponding response;
        generate an expanded feature amount vector for the target item based on an initial feature amount vector of the target item and one or more other initial feature amount vectors of the identified one or more other items, each feature amount vector indicating attribute items in association with respective attribute values;
        calculate a score of the target item based on similarity between the expanded feature amount vector for the target item and expanded feature amount vectors for items to which a target user has shown a response; and
        determine whether to output the target item to the target user in response to a user request based on the calculated score.

2. The information processing apparatus according to claim 1, wherein the circuitry is configured to generate the expanded feature amount vector for the target item using an initial feature amount vector of an item to which the responder has shown a response within a prescribed period including a period in which the responder has shown the response to the target item.

3. The information processing apparatus according to claim 1, wherein the circuitry is configured to generate the expanded feature amount vector for the target item using initial feature amount vectors of a prescribed number of items to which the responder has shown a response immediately before or after having shown the response to the target item.

4. The information processing apparatus according to claim 1, wherein the circuitry is configured to limit the responder to a user belonging to a prescribed group to generate the expanded feature amount vector for the target item.

5. The information processing apparatus according to claim 1, wherein the circuitry is configured to generate the expanded feature amount vector for the target item using an initial feature amount vector of an item belonging to a same group as the target item classified by a prescribed method.

6. The information processing apparatus according to claim 1, wherein the circuitry is configured to generate the expanded feature amount vector for the target item in such a way that the one or more initial feature amount vectors of the identified one or more other items to which the responder has shown the response are added together.

7. The information processing apparatus according to claim 6, wherein the circuitry is configured to increase a weight for an item, to which the responder has shown a response in a period close to a period in which the responder has shown the response to the target item, to add the one or more initial feature amount vectors together.

8. The information processing apparatus according to claim 6, wherein the circuitry is configured to assign a weight corresponding to at least one of a response type and a response degree to add the one or more initial feature amount vectors together.

9. The information processing apparatus according to claim 6, wherein the circuitry is configured to assign a weight to the responder to add the one or more initial feature amount vectors together.

10. The information processing apparatus according to claim 9, wherein the circuitry is configured to assign a weight corresponding to a number of the identified one or more other items, to which the responder has shown the response, to add the one or more initial feature amount vectors together.

11. The information processing apparatus according to claim 6, wherein the circuitry is configured to increase a weight for an item similar to the target item to add the one or more initial feature amount vectors together.

12. The information processing apparatus according to claim 6, wherein the circuitry is configured to set a weight for the initial feature amount vector of the target item at a value different from a value of a weight for the one or more initial feature amount vectors of the identified one or more other items.

13. The information processing apparatus according to claim 6, wherein the circuitry is configured to generate the expanded feature amount vector for the target item without adding thereto the initial feature amount vector of the target item.

14. The information processing apparatus according to claim 1, wherein the circuitry is further configured to search for an item including a provided keyword in an expanded feature amount vector thereof.

15. An information processing method of an information processing apparatus, the method comprising:
    identifying a responder of a target item stored in a storage, the responder having shown a response to the target item;
    identifying one or more other items to which the identified responder has shown a corresponding response;
    generating, by circuitry of the information processing apparatus, an expanded feature amount vector for the target item based on an initial feature amount vector of the target item and one or more other initial feature amount vectors of the identified one or more other items, each feature amount vector indicating attribute items in association with respective attribute values;
    calculating a score of the target item based on similarity between the expanded feature amount vector for the target item and expanded feature amount vectors for items to which a target user has shown a response; and
    determining whether to output the target item to the target user in response to a user request based on the calculated score.

16. The information processing method according to claim 15, wherein generating the expanded feature amount vector for the target item is performed in such a way that the one or more initial feature amount vectors of the identified one or more other items to which the responder has shown the response are added together.

17. A non-transitory, computer-readable medium that includes a program for causing a computer to execute a process, and the process including:
    identifying a responder of a target item, the responder having shown a response to the target item;

identifying one or more other items to which the identified responder has shown a corresponding response;

generating an expanded feature amount vector for the target item based on an initial feature amount vector of the target item and one or more other initial feature amount vectors of the identified one or more other items, each feature amount vector indicating attribute items in association with respective attribute values;

calculating a score of the target item based on similarity between the expanded feature amount vector for the target item and expanded feature amount vectors for items to which a target user has shown a response; and determining whether to output the target item to the target user in response to a user request based on the calculated score.

* * * * *